July 8, 1947.  R. R. KNOX  2,423,711

BALL BEARING FOOT FOR FURNITURE AND THE LIKE

Filed Aug. 3, 1945

INVENTOR
Roy R. Knox
BY John H. Ruckman
ATTORNEY

Patented July 8, 1947

2,423,711

UNITED STATES PATENT OFFICE 2,423,711

BALL-BEARING FOOT FOR FURNITURE AND THE LIKE

Roy R. Knox, New Orleans, La.

Application August 3, 1945, Serial No. 608,621

1 Claim. (Cl. 16—26)

My invention relates to a ball bearing foot for furniture and the like. The term "furniture" is considered to be used in its broad sense of equipment for household and industrial articles for which provision is made to enable such articles to be readily moved around as desired.

An object of this invention is to provide a device in the nature of a foot embodying a construction by means of which when several of the devices are secured to the bottom of the afore-said articles, these articles can be moved around on the floor much more easily and expeditiously than is possible with the use of caster wheels. By attaching these feet the legs of furniture or to bottom of such articles as trunks and chests, the feet are always in a position which never requires any swivelling movement for readily moving the articles into different positions by rolling action on the floor.

The novel features which I believe to be characteristic of this invention, are set forth with particularity in the appended claim. The invention itself, however, both as to organization and operation, together with additional objects and advantages thereof, will be best understood from the following description of specific embodiments when read in connection with the accompanying drawings in which.

Figure 1:
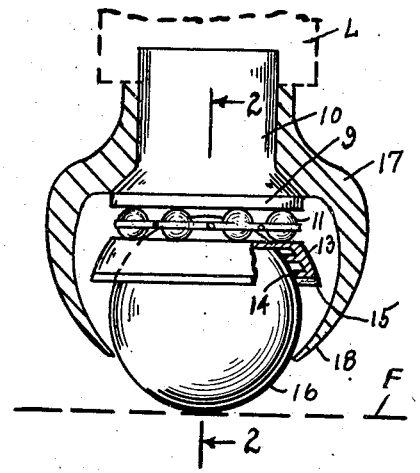
Fig. 1 is an elevational view of one form of the device partly in section.
Figure 2:
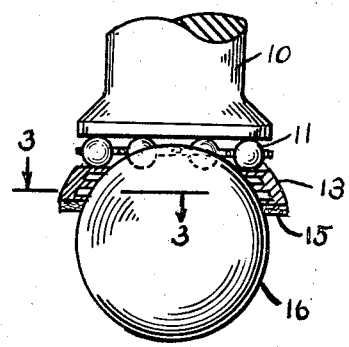
Fig. 2 is a view showing a lower thrust plate in section on the line 2—2 of Fig. 1 and with parts of the device before they are placed in a housing.
Figure 3:
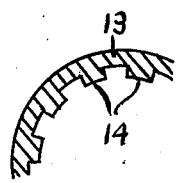
Fig. 3 is a fragmentary view taken in section on the line 3—3 of Fig. 2.
Figure 4:
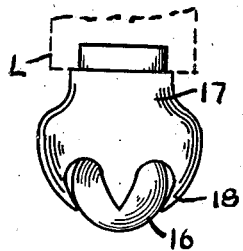
Fig. 4 is an elevational view on a smaller scale.
Figure 7:
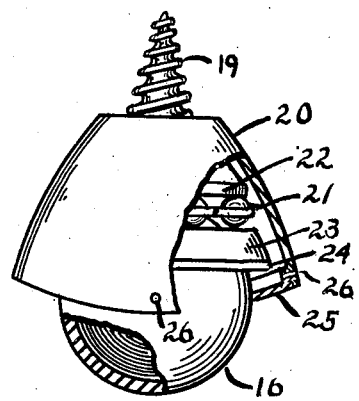
Fig. 7 is an elevational view of a modified form partly broken away and in section.

Referring first to the form of invention shown in Figs. 1, 2, 3, and 4, the numeral 9 designates an upper thrust plate having an upwardly extending stem 10 which is adapted to be secured in any well known or suitable manner to one of the legs of an article. A series of ball bearings 11 with retainers 12 of well known construction are placed in contact with the surface of the plate 9. In this form of the invention a lower thrust plate 13 is in contact with the bearings 11. This plate is downwardly extended at its periphery to form a flange which is provided with internal projections 14. A felt washer 15 is put on the lower side of the plate 13 for absorbing oil. A comparatively larger ball 16 is placed in contact with the projections 14 and the washer 15. This ball may be solid or may be hollow as shown in Fig. 7. A housing 17 extends down from the leg L. This housing has downward arms 18 which are swaged inwardly to hold the ball 16 in the housing 17.

Figure 5:
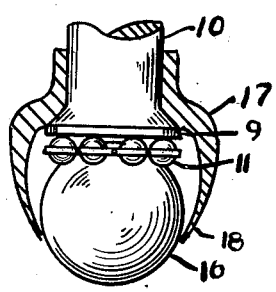
Fig. 5 is an elevational view of a modified form partly broken away and in section.

The form of invention shown in Fig. 5 differs from that previously described in having the lower thrust plate omitted so that the ball bearings 17 come into direct contact with the ball 16.

In the form shown in Fig. 7, a screw 19 is carried by a housing 20 whereby the device is adapted to be secured to the bottom of such articles as trunks and chests which do not have legs. In this form of invention, ball bearings 21 are positioned between an upper thrust plate 22 and a lower thrust plate 23 having a felt washer 24. In this form of the invention, an inwardly flanged ring 25 is secured by fasteners 26 to the lower edge of the housing 20 for holding the ball 16 in place.

Figure 8:
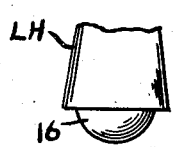
Fig. 8 is an elevational view of another modification.
Figure 7A:
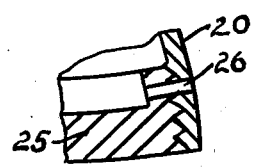
Fig. 7a is a fragmentary sectional view on an enlarged scale to show the ring fastener of Fig. 7.
Figure 6:
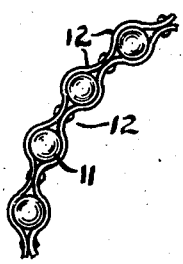
Fig. 6 is a fragmentary view of a ball bearing retainer.

In Fig. 8 LH designates the lower end of a leg which is hollowed out for receiving any of the bearing assemblies previously described.

The operation and advantages of my invention will be obvious from the foregoing description and have already been referred to. With the ball 16 resting on the floor F, articles provided with the ball bearing feet may be readily pushed or pulled into any desired position without any swivelling action taking place such as occurs when caster wheels are used. The ball bearings permit the article to be directly turned through any desired angle.

I claim:

In a device of the character described, the combination of a housing adapted to be attached to the lower portion of an article, a thrust plate inside of said housing, a series of ball bearings in contact with the lower surface of said plate, a thrust plate having its upper surface in contact with said ball bearings, a flange extending downwardly from the periphery of said last mentioned plate, a comparatively large ball below said last mentioned plate, projections extending inwardly from said flange and engaging said ball, and arms extending downwardly from said housing and swaged inwardly for holding said ball in said housing.

ROY R. KNOX.

REFERENCES CITED

The following references are of record in the file of this patent:

UNITED STATES PATENTS

| Number | Name | Date |
|---|---|---|
| 1,900,867 | Olds | Mar. 7, 1933 |
| 1,224,294 | Franzen | May 1, 1917 |
| 663,164 | Fauber | Dec. 4, 1900 |
| 1,222,045 | Sobilo | Apr. 10, 1917 |
| 1,440,641 | Stevens | Jan. 2, 1923 |
| 1,445,747 | Bryant et al. | Feb. 20, 1923 |
| 1,454,119 | Knaack | May 8, 1923 |

FOREIGN PATENTS

| Number | Country | Date |
|---|---|---|
| 3,186 | Great Britain | Feb. 8, 1898 |